United States Patent [19]

Harty et al.

[11] Patent Number: 4,762,662

[45] Date of Patent: Aug. 9, 1988

[54] THERMALLY ACTIVATED TRIGGER DEVICE

[75] Inventors: Richard B. Harty, Canoga Park; Timothy L. Camaret, Acton, both of Calif.

[73] Assignee: Rockwell International Corporation, El Segundo, Calif.

[21] Appl. No.: 793,501

[22] Filed: Oct. 31, 1985

[51] Int. Cl.⁴ .................................................. G21C 7/28
[52] U.S. Cl. .................................... 376/220; 376/336; 376/909; 137/72
[58] Field of Search ............... 376/220, 283, 284, 318, 376/336, 909; 137/72, 907; 91/47, 48, 415, 417 R

[56] References Cited

U.S. PATENT DOCUMENTS

| | | | |
|---|---|---|---|
| 3,162,578 | 12/1964 | Allen | 176/36 |
| 3,313,312 | 4/1967 | Weese | 137/75 |
| 3,432,387 | 3/1969 | Jonsson | 176/36 |
| 3,638,733 | 2/1972 | DeRouville | 169/19 |
| 3,659,624 | 5/1972 | Kelly et al. | 137/72 |
| 3,800,878 | 4/1974 | Poitras | 137/72 |
| 3,855,060 | 12/1974 | Dietrich | 176/36 R |
| 3,933,581 | 1/1976 | McKeehan et al. | 176/36 R |
| 3,992,257 | 11/1976 | Erp et al. | 376/336 |
| 4,076,584 | 2/1978 | Golden et al. | 176/36 R |
| 4,164,953 | 8/1979 | Naab et al. | 137/72 |
| 4,263,839 | 4/1981 | Akkerman et al. | 92/23 |
| 4,422,503 | 12/1983 | Goans | 166/53 |
| 4,498,491 | 2/1985 | Chamberland et al. | 137/72 |

FOREIGN PATENT DOCUMENTS 2148735 4/1973 Fed. Rep. of Germany ...... 376/220

Primary Examiner—Deborah L. Kyle
Assistant Examiner—Richard L. Klein
Attorney, Agent, or Firm—H. Fredrick Hamann; Harry B. Field; Clark E. DeLarvin

[57] ABSTRACT

A thermally activated trigger device 10 comprises a pressurized closed vessel 11 with a piston 12 slideably mounted in it to divide it into two compartments 14 and 16. A fluid such as an inert gas is contained within the compartments at substantially the same pressure. One end of one of the compartments has venting means 24, such as a normally closed pipe which vents the fluid from the compartment once the pipe becomes open by rupture or melting at an elevated temperature. The resulting pressure difference between the compartments on venting of the fluid moves the piston which is connected to an actuator means for performing a desired control or safety shut-down function. The trigger device is useful for performing many control and safety shut-down functions, particularly for rendering a nuclear space reactor subcritical upon reentry to the earth's atmosphere.

4 Claims, 1 Drawing Sheet

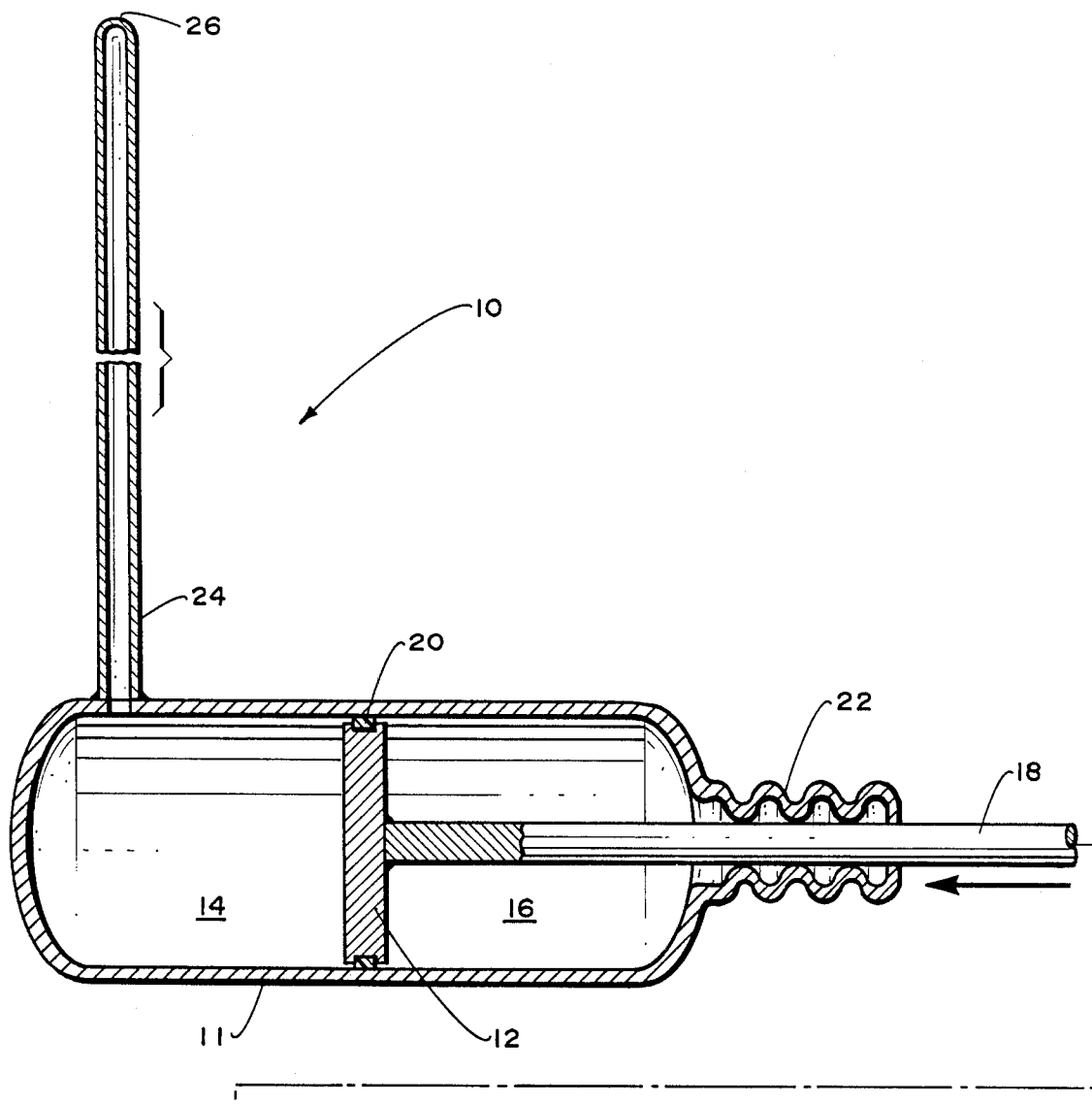

THERMALLY ACTIVATED TRIGGER DEVICE

BACKGROUND OF THE INVENTION

1. Field of the Invention

The present invention relates to a thermally activated trigger device. More particularly it relates to such a device for shutting down a nuclear reactor. Still more particularly it relates to a thermally activated trigger device for rendering a space nuclear reactor subcritical upon reentry to the earth's atmosphere.

2. Description of the Prior Art

Temperature-responsive or thermally activated devices are used for a variety of control and safety cutoff functions involving many specialized applications. In several such devices a change in temperature triggers the movement of a piston in a cylinder to accomplish the desired result. Thus U.S. Pat. No. 3,638,733 shows a heat operated fire extinguisher in which a piston closing the mouth of an extinguishing agent pressure vessel is held in a sealing position by a plug of heat fuseable material. When the ambient temperature indicates the presence of a fire, the plug melts releasing the piston and discharging the pressurized vessel.

U.S. Pat. No. 4,498,491 shows a thermo-electric valve for scuttling buoyant devices. In this valve a low power resistor holds a spring in compression. Passage of a low control circuit current through the resistor disintegrates it and allows the energy of the spring to expand against the piston, which by its movement permits a pressurized medium to become active. Similarly, in U.S. Pat. No. 4,164,953 a flood valve is shown in which a piston assembly is activated by an electrical heating element surrounding a thin-walled section which is melted to permit pressure of a contained fluid to displace the piston assembly.

U.S. Pat. No. 4,422,503 shows a blow-out preventer for use in a control conduit for a downhole safety valve. A fusible link is used to hold a ball check valve in an open position. Melting of the fusible link upon the occurrence of abnormal temperature permits movement of the piston against the ball check valve to close the conduit and prevent fluid flow from the safety valve upwardly through the conduit.

U.S. Pat. No. 4,263,839 shows a heat sensitive locking device. By melting of a fusible link, a spring wire is permitted to uncoil thereby permitting a piston to release locking segments for movement to their unlocked positions.

U.S. Pat. No. 3,313,312 shows a thermally responsive actuator device in which a piston is held in place by a mass of solidified fusible material. When this fusible mass is melted and become liquid in response to an ambient temperature rise, the piston means assembly then becomes operative.

Many control and safety devices have been proposed for use with nuclear reactors, whether of the gas-cooled or liquid-cooled types, including sodium reactors. Basically, in the event of a loss of coolant or other type accident, these control and safety devices act to render the reactor subcritical (incapable of sustaining a nuclear fission reaction) and also to prevent loss of radioactive material to the atmosphere. These devices generally rely on injection of a nuclear poison into the core containing the radioactive fissionable material. Such poisons consist of any material of high absorption cross-section that absorbs neutrons unproductively and hence removes them from the fission chain reaction in a reactor, decreasing its radioactivity. Representative nuclear poisons include boron, cadmium, and hafnium. These are conveniently incorporated into control safety rods, which are then generally inserted from above into the reactor core.

U.S. Pat. No. 3,162,578 shows such a control rod having high neutron capture capabilities for use in a nuclear reactor and operating means to move the control rod at high speed when required. U.S. Pat. No. 3,432,387 shows a pressure-actuated control device for moving neutron-absorbing means into the reactor core. U.S. Pat. No. 3,855,060 shows a bottom actuated reactor control rod device. U.S. Pat. No. 3,933,581 shows another control rod drive for reactor shut-down utilizing a latching assembly. U.S. Pat. No. 4,076,584 shows a magnetically activated rodded shut-down system for a nuclear reactor.

Spacecraft, whether manned or unmanned, require electric power for several purposes. Particularly for long space voyages requiring large power supplies, chemical forms of energy and solar power have many significant limitations. In situations where large amounts of power are needed over long periods of time, the best source of electricity is a nuclear reactor. Thus, the first SNAP (Systems for Nuclear Auxiliary Power) reactor power plant was launched into space and placed in orbit in 1965. It is necessary that nuclear space reactors be rendered subcritical after reentry into the earth's atmosphere. As indicated, many devices are available for rendering terrestrial nuclear reactors subcritical, such as by inserting poison rods, inserting poison sleeves, or moving reactor segments. Such devices rely on some type of mechanical motion or electrical signal to initiate the desired actuation. Electrical signals frequently tend to be unreliable and could be activated prematurely, shutting a reactor down when not desired, or else fail to operate when required.

Accordingly, it is an object of this invention to provide a simple, passive thermally activated trigger device, free from the limitations of known trigger devices, for providing desired control or safety cutoff.

More specifically, it is another object to provide such a thermally activated trigger device particularly suitable for rendering a nuclear reactor subcritical.

It is still a further specific object of the invention to provide such a device that is effective for rendering a nuclear space reactor subcritical after reentry into the earth's atmosphere.

SUMMARY OF THE INVENTION

In its broadest aspects, the thermally activated trigger device of this invention comprises a closed vessel with a piston slideably mounted in the vessel to divide it into two compartments. An expandable pressurized fluid, suitably an inert gas such as argon, neon, helium or nitrogen, is present in each of the compartments at substantially the same pressure. A connecting rod or shaft is operatively connected to the piston, the other end of the rod being connected to actuator means. Communicating with one end of one of the compartments is a normally closed vent means for venting fluid from this compartment when the vent means are open. Suitable vent means consist of one or more closed-end tubes. The vent means are designed to open above a selected temperature so that fluid is vented from the compartment connected to the vent means. This results in a difference in pressure between the two compartments so that the higher pressure in the nonvented compartment moves the piston and thereby activates the actuator means. The movement of the piston and its connecting rod provides the desired motion so that the actuator means serve as a trigger or as a supplier of power to activate a safety device.

The thermally activated trigger device of the present invention is capable of providing control and safety shutdown functions for use in many chemical process industries where an increase in temperature, whether desired or undesired, is the actuating factor. The present invention is particularly suitable for use as a reentry-activated trigger device for a nuclear space reactor. Accordingly, the present invention will be particularly described with respect to providing such a permanent end-of-life shutdown for a nuclear space reactor.

The advantages of the present invention will become more readily apparent from consideration of the following detailed description of the preferred embodiment of the invention in conjunction with the attached drawing.

BRIEF DESCRIPTION OF THE DRAWING

The sole FIGURE of the drawing is a schematic drawing partially in section illustrating the device of the present invention.

DESCRIPTION OF THE PREFERRED EMBODIMENT

Referring to the sole FIGURE of the drawing, there is shown a trigger device 10 comprising a closed vessel 11 containing a piston 12 slideably mounted in the vessel to divide it into two compartments 14 and 16. A pressurized fluid, preferably an inert gas, is contained within each of the compartments at substantially the same pressure. A connecting rod 18 is operatively connected to the piston 12, its other end being connected to an actuator means 28 so that movement of the piston 12 will activate the actuating means. A piston seal 20 acts to minimize fluid leakage between compartments 14 and 16 during activation of piston 12. A bellows arrangement 22 prevents leakage of the fluid from the system while allowing movement of the rod 18. A pipe 24 serves as vent means communicating with compartment 14. The pipe is normally closed by having a sealed tip 26 at its outward end.

EXAMPLE

The following example is set forth to more fully illustrate the preferred embodiment of the invention, but it is not intended as a limitation thereof.

The cylinder 11 may vary in size, a large cylinder being pressurized at a lower pressure than a small cylinder. The pressure inside this cylinder conveniently varies from 100 to 1000 psi. Typically for use in a nuclear space reactor 30 the cylinder 11 will be from 6 to 12 inches in length and have a diameter of about 2 to 4 inches. The connecting rod 18 will typically be about 3 ft in length. Helium or argon is particularly preferred for use as the pressurizing gas. The reactor is equipped with beryllium or beryllium oxide reflectors about 10 inches on its inside, 18 inches on its outside and 14 inches high. About five pipes 24 are distributed throughout various parts of the spacecraft. These pipes are all connected to compartment 14 and each has a rupturable tip 26 at the end thereof. Upon reentry into the earth's atmosphere, a temperature of about 1650°-2200° C. (3000°-4000° F.) is encountered. The stainless steel tips at the end of tube 24, which are located for reentry burnoff, melt and rupture at temperatures above about 1400° C. (2600° F). Thereby compartment 14 is opened to vacuum, and piston 16 and rod 18 move in the direction of the arrow because of the difference in pressure created between compartments 14 and 16. Conveniently the motion of the connecting rods either introduces a beryllium carbide poison into the reactor or moves the reflectors away from the nuclear core. Either of these events will render the reactor subcritical.

Although the invention has been described in terms of a preferred embodiment and a specific illustration, it will be obvious to those of ordinary skill in the art that various modifications and adaptations of the invention are possible without departing from the spirit and scope of the invention as claimed hereinbelow. For example, the thermally activated trigger device is not limited for use with any particular nuclear space reactor, but it is clear that the invention has applications in a wide variety of nuclear space reactors such as those useful for weather observation, communications, and surveillance, as well as for other apparatus and process applications.

We claim:

1. In a nuclear space reactor, a thermally activated trigger device for rendering said reactor subcritical upon reentry to the earth's atmosphere, said device comprising:
   a closed vessel,
   a piston slideably mounted in said vessel to divide it into first and second compartments,
   an inert gas contained within each of said compartments at substantially the same pressure,
   a connecting rod operatively connected to said piston and to actuator means, said actuator means providing for moving means for rendering said reactor subcritical upon movement of said connecting rod;
   a bellows having opposite ends, one of said ends being affixed to and in sealing engagement with said connecting rod and the other of said ends being affixed to and in sealing engagement with said vessel for permitting linear movement of said connecting rod and preventing any escape of said inert gas from said closed vessel; and
   a plurality of normally closed pipes communicating with one of said compartments for venting the inert gas therefrom when any of said pipes is open, said pipes being located at different parts of the nuclear space reactor so that the closed ends thereof are exposed to the atmosphere upon reentry of the reactor to the atmosphere, said pipes being designed to open at a selected temperature resulting from said reentry so that said gas leaves the communicating compartment via an open pipe to cause a difference in pressure between said compartments sufficient for the higher pressure in the other compartment to move said piston and thereby activate said actuator means.

2. The device of claim 1 wherein said inert gas is selected from the class consisting essentially of helium, neon, argon and nitrogen and said gas is initially maintained at a pressure between 100 and 1000 psi.

3. The device of claim 1 wherein each of said pipes has a sealed tip consisting of stainless steel designed to melt and rupture at temperatures above about 1400° C. so as to thereby open said pipe for venting of fluid from its communicating compartment.

4. The device of claim 1 wherein the movement of said piston results in said actuator means moving reflectors away from the reactor core to render the reactor subcritical.

* * * * *